United States Patent [19]

Yonezawa et al.

[11] 4,078,938

[45] Mar. 14, 1978

[54] CERAMIC COMPOSITIONS HAVING HIGH DIELECTRIC CONSTANT

[75] Inventors: Masatomo Yonezawa; Tomeji Ohno, both of Tokyo, Japan

[73] Assignee: Nippon Electric Company, Ltd., Tokyo, Japan

[21] Appl. No.: 759,095

[22] Filed: Jan. 13, 1977

[30] Foreign Application Priority Data

| Jan. 16, 1976 | Japan | 51-3894 |
| Jul. 29, 1976 | Japan | 51-90471 |
| Sep. 16, 1976 | Japan | 51-111056 |
| Dec. 2, 1976 | Japan | 51-145303 |

[51] Int. Cl.$^2$ ............................................. C04B 35/26
[52] U.S. Cl. ................................. 106/39.5; 29/25.42; 106/73.5; 156/89; 252/63.5
[58] Field of Search ........................... 106/39.5, 73.5; 252/63.5

[56] References Cited

PUBLICATIONS

Chem Abstracts, 73, item 92523f.
Chem. Abstracts, 71, item 73674y.
Luff, D. et al., "Ferroelectric Ceramics with High Pyroelectric Properties", Trans. and Journal, Brit. Ceramic Soc. 73 (7), 1974, pp. 251–264.

*Primary Examiner*—Helen M. McCarthy
*Attorney, Agent, or Firm*—Hopgood, Calimafde, Kalil, Blaustein and Lieberman

[57] ABSTRACT

A ceramic composition allowing low-temperature sintering at a temperature below 1000° C and having a high dielectric constant over 5000 essentially contains $Pb(Fe_{\frac{2}{3}}W_{\frac{1}{3}})O_3$ and $Pb(Fe_{\frac{1}{3}}Nb_{\frac{2}{3}})O_3$, in which the molecular ratio of $Pb(Fe_{\frac{2}{3}}W_{\frac{1}{3}})O_3$ to $Pb(Fe_{\frac{1}{3}}Nb_{\frac{2}{3}})O_3$ ranges from about 0.2 to 0.5.

9 Claims, No Drawings

CERAMIC COMPOSITIONS HAVING HIGH DIELECTRIC CONSTANT

BACKGROUND OF THE INVENTION

This invention relates to ceramic compositions having a high dielectric constant and more particularly to ceramic compositions suited as a dielectric material for multilayer ceramic capacitors.

Ceramic compositions essentially consisting of $BaTiO_3$ have been widely used as a ceramic dielectric material of high dielectric constant. However, these $BaTiO_3$-system compositions must be sintered at a very high temperature in the range from 1300° C to 1400° C, so that where they are used as a dielectric material of multilayer ceramic capacitors, costly noble metals such as platinum, palladium or the like which can stand such high sintering temperatures should be used as internal electrodes of the capacitors. Therefore, there has risen a demand for ceramic dielectric materials which can be sintered at a temperature as low as below 1000° C for enabling the use of inexpensive metals such as nickel, silver and the like as the internal electrodes.

It is accordingly an object of the present invention to provide ceramic compositions which allow low-temperature sintering and have a high dielectric constant ($\epsilon$).

Another object of this invention is to provide ceramic compositions of a low dielectric loss (tan $\delta$) and a high specific electric resistivity ($\rho$).

Still another object of the present invention is to provide a method of fabricating multilayer ceramic capacitors with a low cost.

The ceramic compositions according to the present invention consist essentially of $Pb(Fe_{\frac{2}{3}}W_{\frac{1}{3}})O_3$ and $Pb(Fe_{\frac{1}{2}}Nb_{\frac{1}{2}})O_3$ with a molecular ratio of $Pb(Fe_{\frac{2}{3}}W_{\frac{1}{3}})O_3$ to $Pb(Fe_{\frac{1}{2}}Nb_{\frac{1}{2}})O_3$ ranging from about 0.2 to 0.5. The $Pb(Fe_{\frac{2}{3}}W_{\frac{1}{3}})O_3 - Pb(Fe_{\frac{1}{2}}Nb_{\frac{1}{2}})O_3$ ceramic compositions of the invention can be added with at least one compound of $SiO_2$, NiO, ZnO, $Pb(Mn_{\frac{1}{3}}Nb_{\frac{2}{3}})O_3$, $Pb(Mn_{\frac{1}{3}}Ta_{\frac{2}{3}})O_3$ and $Pb(Fe_{\frac{1}{2}}Sb_{\frac{1}{2}})O_3$ for improving their dielectric loss (tan $\delta$) and specific electric resistivity ($\rho$).

Namely, the present invention firstly provides ceramic compositions consisting essentially of 20 to 50 mol % $Pb(Fe_{\frac{2}{3}}W_{\frac{1}{3}})O_3$ and 80 to 50 mol % $Pb(Fe_{\frac{1}{2}}Nb_{\frac{1}{2}})O_3$. In other words, the ceramic compositions represented by the formula $Pb(Fe_{\frac{2}{3}}W_{\frac{1}{3}})_x(Fe_{\frac{1}{2}}Nb_{\frac{1}{2}})_{1-x}O_3$, in which $x$ lies within the range of about 0.2 to 0.5 are provided. These ceramics can be sintered at a temperature not exceeding 1,000° C and have a high dielectric constant ($\epsilon$) of 5,000 or more.

The present invention also provides ceramic compositions consisting of $Pb(Fe_{\frac{2}{3}}W_{\frac{1}{3}})_x(Fe_{\frac{1}{2}}Nb_{\frac{1}{2}})_{1-x}O_3$ as a basic constituent, in which $x$ lies within the range of about 0.2 to 0.5, and at least one oxide selected from the group consisting of $SiO_2$, ZnO and NiO as a sub constituent wherein an amount of such sub constituent is in the range of about 0.02 to 1.0 mol % with respect to the whole composition.

The present invention further provides ceramic compositions consisting essentially of $Pb(Fe_{\frac{2}{3}}W_{\frac{1}{3}})_x(Fe_{\frac{1}{2}}Nb_{\frac{1}{2}})_{1-x}O_3$ as the basic constituent, in which $x$ ranges from about 0.2 to 0.5, and at least one compound selected from the group consisting of $Pb(Mn_{\frac{1}{3}}Nb_{\frac{2}{3}})O_3$, $Pb(Mn_{\frac{1}{3}}Ta_{\frac{2}{3}})O_3$ and $Pb(Mn_{\frac{1}{3}}Sb_{\frac{2}{3}})O_3$ as the sub constituent with the molecular ratio of the sub constituents to the whole composition of about 0.05 to 20.0, 0.05 to 10.0 and 0.05 to 5.0 mol%, respectively. In other words, the ceramic compositions consisting essentially of $Pb(Fe_{\frac{2}{3}}W_{\frac{1}{3}})O_3$ $_x$ · $Pb(Fe_{\frac{1}{2}}Nb_{\frac{1}{2}})O_3$ $_y$ · $Pb(Mn_{\frac{1}{3}}Me_{\frac{2}{3}})O_3$ $_z$ wherein Me represents one of Nb, Ta and Sb and $x + y + z$ 1.00 are provided, in which $x$ ranges from about 0.1000 to 0.5005, $y$ ranges from about 0.4000 to 0.7995, while $z$ ranges from about 0.0005 to 0.2000 for Nb, from about 0.0005 to 0.1000 for Ta and from about 0.0005 to 0.0500 for Sb.

The ceramic compositions added with the mentioned oxide or compound have a high specific resistivity of $1 \times 10^9$ $\Omega$-cm or more and a low dielectric loss (tan $\delta$) of less than 5% as well as a high dielectric constant of 5,000 or more and can be sintered at a temperature not exceeding 1,000° C.

The present invention also provides a method of fabricating a multiplayer ceramic capacitor which comprises the steps of forming a sheet containing materials necessary to obtain a composition consisting essentially of $Pb(Fe_{\frac{2}{3}}W_{\frac{1}{3}})_x \cdot Pb(Fe_{\frac{1}{2}}Nb_{\frac{1}{2}})_{1-x}O_3$ ($0.2 \leq X \leq 0.5$) or of $[Pb(Fe_{\frac{2}{3}}W_{\frac{1}{3}})]_x [Pb(Fe_{\frac{1}{2}}Nb_{\frac{1}{2}})]_{1-x}O_3$ ($0.2 \leq X \leq 0.5$) and at least one of $SiO_2$, ZnO, NiO, $Pb(Mn_{\frac{1}{3}}Nb_{\frac{2}{3}})$ $O_3$, $Pb(Mn_{\frac{1}{3}}Ta_{\frac{2}{3}})$ $O_3$ and $Pb(Mn_{\frac{1}{3}}Sb_{\frac{2}{3}})$ $O_3$, applying to a surface of said sheet a layer of metal such as Ag paste, nickel, and Ag-Pd paste which is vaporized or corroded at a temperature well over 1,000° C, laminating a plurality of said sheet at least one of which has said metal layer thereon, and sintering the laminated body at a temperature of below 1,000° C and favorably of 850° to 990° C. According to this method of fabricating a laminated ceramic capacitor of the present invention, the sintering temperature to form ceramic dielectric is less than 1,000° C, which makes it possible to use inexpensive metals such as nickel, silver, siver-rich alloy and nickel-rich alloy which cannot stand a high temperature well over 1,000° C as internal electrodes in multiplayer or laminated ceramic capacitors without damage. Accordingly, the cost of fabricating the laminated ceramic capacitors can be highly reduced.

The first example of the ceramics of the present invention will be described.

Lead oxide (PbO), iron oxide ($Fe_2O_3$), tungsten oxide ($WO_3$) and niobium oxide ($Nb_2O_5$) were used as starting materials. Powders of these materials having a purity of 99% or more were weighed so that compositions shown in Table 1 be resulted. Then, the powders thus weighed were mixed with water or alcohol added as a solvent in a ball mill. After filtration and drying, the mixtures were presintered at a temperature in the range from 750° C to 850° C. These materials were crushed and then molded under the pressure of about 0.7 ton/cm² into a solid cylindrical shape of a diameter of about 16 mm and a thickness of about 10 mm, followed by sintering at a temperature in the range from 900° c to 990° C. The sintered bodies were cut into discs of about 0.5 mm thick, and then silver electrodes were provided on both the principal surfaces of the resultant discs by burning at 600° C. The dielectric constant ($\epsilon$) and the dielectric loss (tan $\delta$) were measured at 20° C at a frequency of 1 KHz. The temperature coefficients of dielectric constant (T.C.) were calculated according to the following formula:

$$\{[\epsilon(85) - \epsilon(20)]/\epsilon(20)\} \times 100$$

wherein $\epsilon(85)$ represents the dielectric constant at a temperature of 85° C, and $\epsilon(20)$ represents the dielectric constant at a temperature of 20° C.

Properties of ceramic compositions thus obtained are shown in Table 1. Specimens shown with an asterisk in the table are compositions outside the scope of the present invention.

Table 1

| Specimen No. | Compositions (mol %) | | $\epsilon$ (20° C) | tan $\delta$ (%) | T.C. (%) |
|---|---|---|---|---|---|
| | Pb(Fe⅔W⅓)O₃ | Pb(Fe½Nb½)O₃ | | | |
| 1* | 10 | 90 | 4100 | 7.6 | +7.6 |
| 2 | 20 | 80 | 8400 | 5.3 | +25 |
| 3 | 30 | 70 | 20300 | 4.6 | −53 |
| 4 | 40 | 60 | 19500 | 3.7 | −70 |
| 5 | 50 | 50 | 10200 | 5.5 | −67 |
| 6* | 60 | 40 | 4900 | 8.3 | +8.3 |

As can be seen from Table 1, ceramic compositions Nos. 2 to 5 within the scope of the present invention provide high dielectric constant ($\epsilon$) over 5000 and dielectric loss (tan $\delta$) lower than 5.5%, and yet permit sintering at a temperature as low as below 1000° C. Meanwhile, the compositions Nos. 1 and 6 outside the scope of the present invention fail to present high dielectric constant ($\epsilon$) over 5000 and low dielectric loss (tan $\delta$) less than 5.5%. In addition, composition No. 6 cannot be sintered at a temperature below 1000° C. In the ceramic compositions represented by the formula Pb(Fe⅔W⅓)ₓ(Fe½Nb½)₁₋ₓO₃, where the value of $x$ lies outside the range of about 0.2 to 0.5, curie point is shifted to a large extent from a room temperature to a high temperature side or low temperature side, so that the dielectric constant ($\epsilon$) at a room temperature is lowered. Therefore such compositions are not suited for use as a dielectric material of capacitors.

The second example of the present invention will be described in more detail.

Powders of lead oxide (PbO), iron oxide (Fe₂O₃), tungsten oxide (WO₃), niobium oxide (Nb₂O₅), nickel oxide (NiO), zinc oxide (ZnO) and silicon oxide (SiO₂) of at least 99% purity were used as starting materials and weighed so as to obtain compositions shown in Table 2. Then, these powders were mixed in a ball mill in the same way as the first example and pre-sintered at a temperature of 700° C to 850° C. Then, these materials were crushed and molded under a pressure of about 0.7 ton/cm² into a solid cylindrical shape of a diameter of about 16 mm and a thickness of about 10 mm, followed by sintering at a temperature ranging from 880° C to 980° C. The sintered bodies were cut into discs about 0.5 mm thick, and then silver electrodes were applied on both principal surfaces of the resultant discs. The properties $\epsilon$ and tan $\delta$ were measured as in the first example, The specific electrical resistivity ($\rho$) was measured at 20° C by using D.C. 100 volts. The results are shown in Table 2.

Specimens shown with an asterisk in the table are compositions outside the scope of the present invention.

Table 2

| Specimen No. | Compositions of basic constituent | | Kind of subconstituent | Quantity of subconstituent (mol %) | $\epsilon$ (20° C) | tan $\delta$ (20° C) (%) | $\rho$(20° C) ($\Omega$-cm) |
|---|---|---|---|---|---|---|---|
| | Pb(Fe⅔W⅓)O₃ | Pb(Fe½Nb½)O₃ | | | | | |
| 7 | 20 | 80 | — | — | 8400 | 5.3 | $8 \times 10^7$ |
| 8 | 20 | 80 | SiO₂ | 0.2 | 7540 | 1.1 | $5 \times 10^{11}$ |
| 9 | 36 | 64 | — | — | 19800 | 5.2 | $5 \times 10^7$ |
| 10 | 36 | 64 | SiO₂ | 0.02 | 19200 | 3.6 | $3 \times 10^9$ |
| 11 | 36 | 64 | SiO₂ | 0.05 | 17700 | 2.4 | $7 \times 10^{10}$ |
| 12 | 36 | 64 | SiO₂ | 0.10 | 16900 | 1.6 | $2 \times 10^{11}$ |
| 13 | 36 | 64 | SiO₂ | 0.20 | 15500 | 1.0 | $5 \times 10^{11}$ |
| 14 | 36 | 64 | SiO₂ | 0.30 | 12500 | 0.86 | $6 \times 10^{11}$ |
| 15 | 36 | 64 | SiO₂ | 0.50 | 9150 | 0.71 | $6 \times 10^{11}$ |
| 16 | 36 | 64 | SiO₂ | 0.70 | 8200 | 1.5 | $1 \times 10^{11}$ |
| 17 | 36 | 64 | SiO₂ | 1.00 | 7070 | 5.0 | $4 \times 10^{10}$ |
| 18* | 36 | 64 | SiO₂ | 1.30 | 4860 | 8.5 | $2 \times 10^9$ |
| 19 | 50 | 50 | — | 0 | 10200 | 5.5 | $4 \times 10^7$ |
| 20 | 50 | 50 | SiO₂ | 0.10 | 9500 | 1.4 | $3 \times 10^{11}$ |
| 21 | 20 | 80 | ZnO | 0.2 | 10100 | 3.4 | $6 \times 10^{10}$ |
| 22 | 36 | 64 | ZnO | 0.05 | 24500 | 3.0 | $4 \times 10^8$ |
| 23 | 36 | 64 | ZnO | 0.1 | 24200 | 4.0 | $1 \times 10^{10}$ |
| 24 | 36 | 64 | ZnO | 0.1 | 24200 | 4.0 | $1 \times 10^{10}$ |
| 25 | 36 | 64 | ZnO | 0.5 | 25600 | 2.2 | $3 \times 10^{10}$ |
| 26 | 36 | 64 | ZnO | 1.0 | 25100 | 4.8 | $1 \times 10^{10}$ |
| 27* | 36 | 64 | ZnO | 1.5 | 24700 | 11.2 | $2 \times 10^9$ |
| 28 | 50 | 50 | ZnO | 0.2 | 12100 | 2.8 | $2 \times 10^{10}$ |
| 29 | 20 | 80 | NiO | 0.3 | 9800 | 2.0 | $5 \times 10^{11}$ |
| 30 | 36 | 64 | NiO | 0.02 | 20700 | 4.2 | $5 \times 10^8$ |
| 31 | 36 | 64 | NiO | 0.1 | 22100 | 3.8 | $3 \times 10^{10}$ |
| 32 | 36 | 64 | NiO | 0.3 | 23200 | 1.6 | $3 \times 10^{11}$ |
| 33 | 36 | 64 | NiO | 0.5 | 23900 | 2.0 | $5 \times 10^{11}$ |
| 34 | 36 | 64 | NiO | 1.0 | 24300 | 4.5 | $6 \times 10^{10}$ |
| 35* | 36 | 64 | NiO | 1.5 | 23500 | 9.3 | $5 \times 10^9$ |
| 36 | 50 | 50 | NiO | 0.3 | 12400 | 2.4 | $3 \times 10^{11}$ |

As is apparent from Table 2, composition Nos. 8, 10 to 18 and 20 show that dielectric loss (tan $\delta$) can be lowered and specific electrical resistivity ($\rho$) can be increased by adding about 0.02 to 1.0 mol % SiO₂ as a subconstituent. Composition No. 18 shows that the addition of SiO₂ in an amount of over 1.0 mol % leads to remarkable reduction in dielectric constant ($\epsilon$) and to increase in dielectric loss (tan $\delta$). Compositions Nos. 21 to 28 show that dielectric constant ($\epsilon$) and specific electrical resistivity ($\rho$) can be increased and dielectric loss (tan $\delta$) can be reduced by adding about 0.02 to 1.0 mol % ZnO as a subconstituent. In this respect, as is apparent from composition 27, the addition of ZnO in an amount of over 1.0 mol % leads to increase in dielectric loss (tan $\delta$) over 10%.

Compositions Nos. 29 and 30 show that dielectric constant ($\epsilon$) and specific electrical resistivity ($\rho$) can be increased and dielectric loss (tan $\delta$) can be reduced by adding about 0.02 to 1.00 mol % NiO as a sub constituent. In this respect, as is apparent from composition No. 35, the addition of NiO in an amount of over 10 mol % leads to increase in dielectric loss (tan $\delta$) over 9%.

The third example of the present invention will be described below.

Lead oxide (PbO), iron oxide (Fe$_2$O$_3$), tungsten oxide (WO$_3$), niobium oxide (Nb$_2$O$_5$), tantalum oxide (Ta$_2$O$_5$), antimony oxide (Sb$_2$O$_3$), and manganese carbonate (MnCO$_3$) were used as starting materials and powders of these materials weighed so as to obtain compositions shown in Table 3. Then, these materials were mixed in a ball mill in the same way as the first example and pre-sintered at a temperature in the range from 750° C to 850° C. Then, these materials were crushed and molded under a pressure of 0.7 ton/cm$^2$ into a solid cylindrical shape of a diameter of about 16 mm and a thickness of about 10 mm, followed by sintering at a temperature of 880° C to 990° C. The bodies thus sintered were cut into discs of a thickness of about 0.5 mm, and then silver electrodes were applied thereto. The dielectric constant ($\epsilon$) and the dielectric loss (tan $\delta$) were measured at $-30°$ C, 20° C and 85° C respectively at 20° C and at frequency of 1 KHz. The specific electrical resistivity ($\rho$) was measured by using D.C. 100 volts at 20° C. The temperature coefficients (T.C.) of the dielectric constant ($\epsilon$) at $-30°$ C and at 85° C were calculated according to the following formula;

$$\{(\epsilon(t) - \epsilon(20))/\epsilon(20)\} \times 100$$

wherein $\epsilon(t)$ represents the dielectric constant at a temperature of $t$ ° C ($t = -30°$ C or 85° C), and $\epsilon(20)$ represents the dielectric constant at a temperature of 20° C. Table 3 shows the relationship between the compositions of ceramic compositions and their properties. Specimens shown with an asterisk in the table are compositions outside the scope of the present invention.

is apparent from compositions Nos. 52 to 57, by adding 0.05 to 10.0 mol % of Pb(Mn$_\frac{1}{3}$Ta$_\frac{2}{3}$)O$_3$ as the subconstituent to the above basic constituent, the ceramic compositions having a high dielectric constants ($\epsilon$) over 7000, a low dielectric loss (tan $\delta$) at 20° C less than 5% and a high specific electrical resistivity over $1 \times 10^9$ $\Omega$-cm can be gained. In this respect, the addition of Pb(Mn$\frac{1}{3}$ Ta$\frac{2}{3}$)O$_3$ in an amount of over 10.0 mol % as the sub constituent failed to enable the low-temperature sintering at a temperature less than 1000° C. According to the invention, as is apparent from compositions Nos. 58 to 65, there are provided the ceramic compositions having a high dielectric constant ($\epsilon$) over 5000, a low dielectric loss (tan $\delta$) at 20° C less than 5% and a high specific electrical resistivity over $1 \times 10^{10}$ $\Omega$.cm by adding 0.05 to 5.0 mol % of Pb(Mn$_\frac{1}{3}$Sb$_\frac{2}{3}$)O$_3$ as the sub constituent to the above basic constituent. However, as shown by the composition No. 64, addition of Pb(Mn$_\frac{1}{3}$Sb$_\frac{2}{3}$)O$_3$ in an amount of over 5.0 mol % reduces the dielectric constant ($\epsilon$) below 5000.

As can be seen from the second and third examples, there may be obtained ceramic compositions having a dielectric constant of over 5000, a dielectric loss of no more than 5% and insulating resistance of over $1 \times 10^9$ $\Omega$.cm, at a sintering temperature less than 1,000° C.

An example of fabrication of a laminated ceramic capacitor employing the compositions of the present invention will be described.

Lead oxide (PbO), iron oxide (Fe$_2$O$_3$), tungsten oxide (WO$_3$), niobium oxide (Nb$_2$O$_5$), and manganese carbonate (MnCO$_3$) powders of at least 99% purity were used as starting materials and so weighed that compositions Table 3

| Specimen No. | Composition (mol %) | | | | $\epsilon$ (20° C) | tan $\delta$ (%) | | T.C. (%) | | $\rho$ (20° C) |
|---|---|---|---|---|---|---|---|---|---|---|
| | Me | Pb(Mn$_\frac{1}{3}$Me$_\frac{2}{3}$)O$_3$ | Pb(Fe$_\frac{2}{3}$W$_\frac{1}{3}$)O$_3$ | Pb(Fe$_\frac{1}{2}$Nb$_\frac{1}{2}$)O$_3$ | | 20° C | 85° C | $-30°$ C | 85° C | $\Omega$-cm |
| 37 | Nb | 2.00 | 19.60 | 78.40 | 7530 | 2.3 | 1.6 | $-65$ | $+22$ | $3 \times 10^{11}$ |
| 38 | — | — | 36.0 | 64.0 | 19800 | 5.2 | 25.8 | $-70$ | $-73$ | $5 \times 10^7$ |
| 39 | Nb | 0.05 | 35.98 | 63.97 | 20900 | 4.4 | 9.7 | $-75$ | $-80$ | $8 \times 10^9$ |
| 40 | Nb | 0.10 | 35.96 | 63.94 | 22600 | 2.4 | 8.6 | $-76$ | $-81$ | $1.4 \times 10^{11}$ |
| 41 | Nb | 0.20 | 35.93 | 63.87 | 20300 | 1.5 | 5.0 | $-72$ | $-79$ | $5 \times 10^{11}$ |
| 42 | Nb | 0.50 | 35.82 | 63.68 | 18200 | 0.68 | 0.42 | $-68$ | $-75$ | $4 \times 10^{11}$ |
| 43 | Nb | 1.00 | 35.64 | 63.36 | 17200 | 0.81 | 0.55 | $-61$ | $-73$ | $7 \times 10^{11}$ |
| 44 | Nb | 3.00 | 34.20 | 60.08 | 12200 | 0.90 | 0.40 | $-58$ | $-69$ | $2 \times 10^{11}$ |
| 45 | Nb | 5.00 | 34.20 | 60.80 | 10800 | 1.5 | 0.88 | $-56$ | $-67$ | $7 \times 10^{10}$ |
| 46 | Nb | 7.00 | 33.43 | 59.52 | 10150 | 2.5 | 1.3 | $-52$ | $-67$ | $3 \times 10^{10}$ |
| 47 | Nb | 10.00 | 32.40 | 57.60 | 8190 | 3.3 | 2.1 | $-48$ | $-65$ | $7 \times 10^9$ |
| 48 | Nb | 20.00 | 28.80 | 51.20 | 5270 | 4.6 | 3.7 | $-39$ | $-54$ | $1 \times 10^9$ |
| 49* | Nb | 25.60 | 27.00 | 48.00 | 3830 | 7.6 | 10.3 | $-35$ | $-52$ | $3 \times 10^8$ |
| 50 | Nb | 2.0 | 49.00 | 49.00 | 8850 | 2.6 | 1.1 | $+65$ | $-62$ | $1 \times 10^{11}$ |
| 51 | — | — | 20.0 | 80 | 8400 | 5.3 | 27.6 | $-68$ | $+25$ | $8 \times 10^7$ |
| 52 | Ta | 1.0 | 19.80 | 79.20 | 7950 | 1.9 | 1.3 | $-66$ | $+24$ | $4 \times 10^{11}$ |
| 53 | Ta | 0.50 | 35.82 | 63.68 | 17500 | 0.70 | 0.49 | $-67$ | $-77$ | $5 \times 10^{11}$ |
| 54 | Ta | 2.00 | 35.28 | 62.72 | 15900 | 0.88 | 0.58 | $-59$ | $-76$ | $2 \times 10^{11}$ |
| 55 | Ta | 5.00 | 34.20 | 60.80 | 11300 | 1.44 | 0.94 | $-55$ | $-65$ | $8 \times 10^{10}$ |
| 56 | Ta | 10.00 | 32.40 | 57.60 | 8020 | 3.0 | 2.3 | $-46$ | $-64$ | $9 \times 10^9$ |
| 57 | Ta | 1.0 | 49.50 | 49.50 | 9170 | 2.7 | 1.8 | $+68$ | $-64$ | $9 \times 10^{10}$ |
| 58 | Sb | 0.50 | 19.90 | 79.60 | 7140 | 1.5 | 0.92 | $-61$ | $+19$ | $6 \times 10^{11}$ |
| 59 | Sb | 0.20 | 35.93 | 63.87 | 18200 | 1.6 | 1.0 | $-55$ | $-76$ | $5 \times 10^{11}$ |
| 60 | Sb | 0.50 | 35.82 | 63.68 | 15100 | 1.0 | 0.90 | $-48$ | $-73$ | $1 \times 10^{12}$ |
| 61 | Sb | 1.00 | 35.64 | 63.36 | 11900 | 0.80 | 1.2 | $-39$ | $-70$ | $9 \times 10^{11}$ |
| 62 | Sb | 3.00 | 34.92 | 62.08 | 9800 | 0.70 | 0.83 | $-25$ | $-68$ | $2 \times 10^{11}$ |
| 63 | Sb | 5.00 | 34.20 | 60.80 | 5480 | 0.84 | 1.8 | $+10$ | $-54$ | $4 \times 10^{10}$ |
| 64* | Sb | 7.00 | 33.48 | 59.52 | 3490 | 0.99 | 2.7 | $+17$ | 59 | $1 \times 10^{10}$ |
| 65 | Sb | 0.50 | 49.75 | 49.75 | 8330 | 1.9 | 1.2 | $+75$ | $-59$ | $2 \times 10^{11}$ |

According to the invention, as is apparent from compositions Nos. 37 to 50 in Table 3, the ceramic compositions having a high dielectric constant ($\epsilon$) over 5000, a low dielectric loss at 20° C within 5% and a high specific electrical resistivity ($\rho$) over $1 \times 10^9$ $\Omega$.cm can be gained by adding 0.05 to 20.0 mol % of Mb(Mn$_\frac{1}{3}$Nb$_\frac{2}{3}$)O$_3$ as the subconstituent to the basic constituent consisting of Pb(Fe$_\frac{2}{3}$W$_\frac{1}{3}$) $\times$ (Fe$_\frac{1}{2}$Nb$_\frac{1}{2}$)$_{1-x}$O$_3$, in which $x$ lies within the range of about 0.2 to 0.5. As shown by the composition No. 49, the addition of Pb(Mn$_\frac{1}{3}$Nb$_\frac{2}{3}$) in an amount over 20.0 mol % fails to present above features. Also, as of Table 4 by finally obtained. Then these materials were mixed in a ball will with a small amount of trichloroethylene added as a solvent and with about 20 weight % of organic binder. Then this mixture was overspread on a flat surface and transfered into sheet of 70 $\mu$ in thickness, 40 mm in width and 60 mm in length. The green sheet was dried and applied with a Ag paste by silk screen printing method so that a plurality of metallized layers for internal electrodes of 3 mm in width, 5 mm in length at about 8 μm in thickness were formed. Then five sheets of these metallized sheet with metallized layers and one sheet without a metallized layer were laminated in a manner that the metallized layers on the adjacent sheets be shifted by about 1.5 mm in their length direction from each other and top and bottom surfaces of the laminated body have no metallized layer. Then the laminated ceramic body was cut into plurality of laminated chips of 4 mm in width and 6 mm in length, so that the metallized layers be exposed at the side faces of the chips on every other sheets. Then the both side faces of the chips were coated with a Ag paste for terminal electrodes. Then, these laminated chips were sintered at a temperature of 880° to 970° C. The organic binder and the solvent of trichloroethylene were completely vaporized in this sintering. Typical examples of the laminated ceramic capacitors thus gained are shown in Table 4.

Table 4

| Specimen No. | Ceramic composition | Capacitance $\mu F$ (20° C) | tan δ % (20° C) |
|---|---|---|---|
| 60 | $Pb(Fe_{2/3}W_{1/3})_{0.3654}\cdot Pb(Fe_{1/2}Nb_{1/2})_{0.6336}\cdot Pb(Mn_{1/3}Nb_{2/3})_{0.01}$ | 0.17 | 0.70 |
| 61 | $Pb(Fe_{2/3}W_{1/3})_{0.3492}\cdot Pb(Fe_{1/2}Nb_{1/2})_{0.6208}\cdot Pb(Mn_{1/3}Nb_{2/3})_{0.03}$ | 0.14 | 0.20 |

According to the present example, there are provided the laminated ceramic capacitors employing a Ag layer as their internal electrodes without damage because of low-temperature sintering at a temperature below 1000° C.

While description has been given of the examples of the present invention, the ceramic compositions according to the present invention can be obtained at a sintering temperature of less than 1000° C, so that the durability of furnace materials for use in sintering may be extremely extended and the manufacturing cost of the ceramic compositions may be lowered due to reduction in electric power. Moreover, the cost of internal electrodes for use in large capacity laminated ceramic capacitors are reduced. Therefore, ceramic compositions according to the present invention are well adapted for use in mass production.

We claim:

1. High dielectric ceramic compositions consisting essentially of $Pb(Fe_{\frac{1}{2}}W_{\frac{1}{2}})_x (Fe_{\frac{1}{2}}Nb_{\frac{1}{2}})_{1-x}O_3$, wherein $x$ ranges from about 0.2 to 0.5.

2. The ceramic compositions of claim 1, further containing at least one oxide selected from the group consisting of $SiO_2$, NiO and ZnO in an amount of about 0.002 to 1.0 mol %.

3. The ceramic compositions of claim 1, further containing $Pb(Mn_{\frac{1}{3}}Nb_{\frac{2}{3}})O_3$ in an amount of about 0.05 to 20.0 mol %.

4. The ceramic compositions of claim 1, further containing $Pb(Mn_{\frac{1}{3}}Ta_{\frac{2}{3}})O_3$ in an amount of about 0.05 to 10.0 mol %.

5. The ceramic composition of claim 1, further containing $Pb(Mn_{\frac{1}{3}}Sb_{\frac{2}{3}})O_3$ in an amount of about 0.05 to 5.0 mol %.

6. Ceramic compositions consisting essentially of $Pb(Fe_{\frac{1}{2}}W_{\frac{1}{2}})x (Fe_{\frac{1}{2}}Nb_{\frac{1}{2}})_{1-x}O_3$ as a basic constituent, in which $x$ lies within the range of about 0.2 to 0.5, and at least one oxide selected from the group consisting of $SiO_2$, NiO and ZnO as a sub constituent wherein an amount of said sub constituent is in the range of about 0.02 to 1.0 mol % with respect to the whole composition.

7. Ceramic compositions consisting essentially of $Pb(Fe_{\frac{1}{2}}W_{\frac{1}{2}})O_{3x} \cdot Pb(Fe_{\frac{1}{2}}Nb_{\frac{1}{2}})O_{3y} \cdot Pb(Mn_{\frac{1}{3}}Nb_{170})O_{3z}$ with a proviso that $x + y + z = 1.00$, in which $x$, $y$ and $z$ range from about 0.1000 to 0.5005, from about 0.400 to 0.7995, and from about 0.0005 to 0.2000, respectively.

8. Ceramic compositions consisting essentially of $Pb(Fe_{\frac{1}{2}}W_{\frac{1}{2}})O_{3x} \cdot Pb(Fe_{\frac{1}{2}}Nb_{\frac{1}{2}})O_{3y} \cdot Pb(Mn_{\frac{1}{3}}Ta_{\frac{2}{3}})O_{3z}$ with a proviso that $x + y + z = 1.00$, in which $x$, $y$ and $z$ range from about 0.1000 to 0.5005, from about 0.4000 to 0.7995 and from about 0.0005 to 0.1000, respectively.

9. Ceramic compositions consisting essentially of $Pb(Fe_{\frac{1}{2}}W_{\frac{1}{2}})O_{3x} \cdot Pb(Fe_{\frac{1}{2}}Nb_{\frac{1}{2}})O_{3y} \cdot Pb(Mn_{\frac{1}{3}}Sb_{\frac{2}{3}})O_{3z}$ with a proviso that $x + y + z = 1.00$, in which $x$, $y$ and $z$ range from about 0.1000 to 0.5005, from about 0.4000 to 0.7995, and from about 0.0005 to 0.0500, respectively.

* * * * *

UNITED STATES PATENT OFFICE
CERTIFICATE OF CORRECTION

Patent No. 4,078,938            Dated March 14, 1978

Inventor(s) MASATOMO YONEZAWA

It is certified that error appears in the above-identified patent and that said Letters Patent are hereby corrected as shown below:

Column 8, claim 7, line 29, in the last portion of the formula, $$\text{"}Nb_{170}\text{"} \text{ should be } --Nb_{2/3}--.$$

The correct name of the assignee should read:

Nippon Electric Co., Ltd.

*Signed and Sealed this*

*Nineteenth* Day of *September 1978*

[SEAL]

*Attest:*

RUTH C. MASON
*Attesting Officer*

DONALD W. BANNER
*Commissioner of Patents and Trademarks*